United States Patent [19]

Roberson et al.

[11] 4,311,500
[45] Jan. 19, 1982

[54] METHOD OF AND MEANS FOR REMOVAL OF GLASS FLOODS FROM A SURFACE OF A GLASS STREAM FEEDER

[75] Inventors: Cletis L. Roberson; Roland E. Langlois, both of Newark, Ohio

[73] Assignee: Owens-Corning Fiberglas Corporation, Toledo, Ohio

[21] Appl. No.: 161,955

[22] Filed: Jun. 23, 1980

[51] Int. Cl.³ .......................................... C03B 17/025
[52] U.S. Cl. .............................................. 65/2; 65/1; 65/3.1; 65/11.1
[58] Field of Search ................... 65/1, 2, 12, 3.1, 11.1

[56] References Cited

U.S. PATENT DOCUMENTS

| | | | |
|---|---|---|---|
| 3,475,148 | 10/1969 | Higginbotham | 65/2 |
| 3,676,094 | 7/1972 | Russell | 65/3 |
| 3,725,021 | 4/1973 | Trout et al. | 65/6 |
| 3,736,116 | 5/1973 | Russell | 65/2 |
| 3,829,301 | 8/1974 | Russell | 65/2 |
| 3,989,494 | 11/1976 | Veazie | 65/2 |

Primary Examiner—Robert L. Lindsay, Jr.
Attorney, Agent, or Firm—Ronald C. Hudgens; Kenneth H. Wetmore; Harry O. Ernsberger

[57] ABSTRACT

The disclosure embraces a method of and apparatus for removing glass floods that may form on the tip section or orifice plate of a stream feeder, bushing or substrate from which normally flow streams of glass, the method and apparatus involving the application or delivery of a stream or streams of liquid carbonaceous or hydrocarbon material onto the glass flooded area, the liquid material being decomposed in an atmospheric environment or in an inert or nonoxidizing environment by the high temperatures of the feeder, bushing or substrate and the molten glass to release carbon particles which are effective to dewet the glass flood and remove the flood.

24 Claims, 8 Drawing Figures

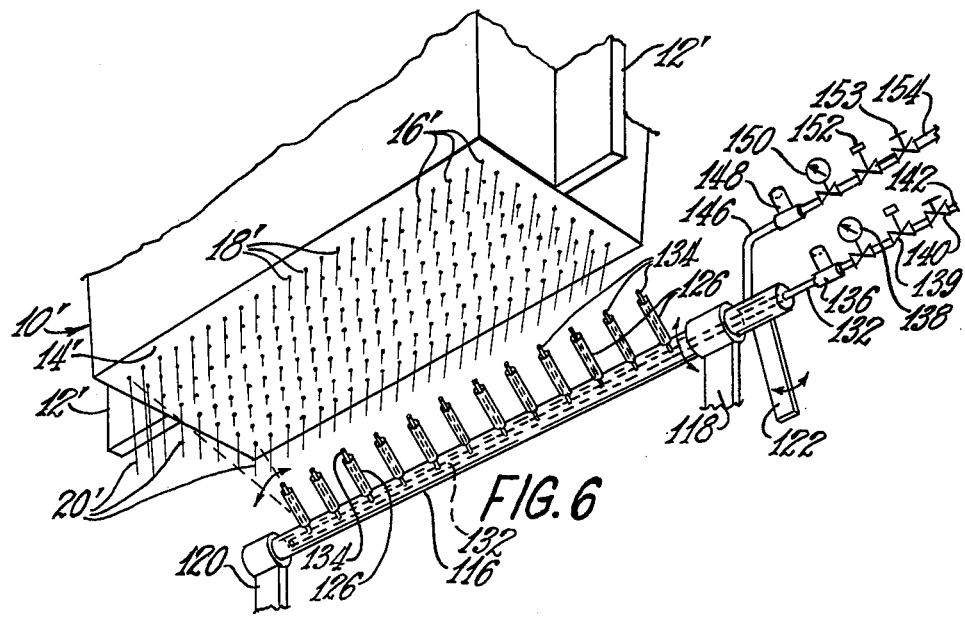
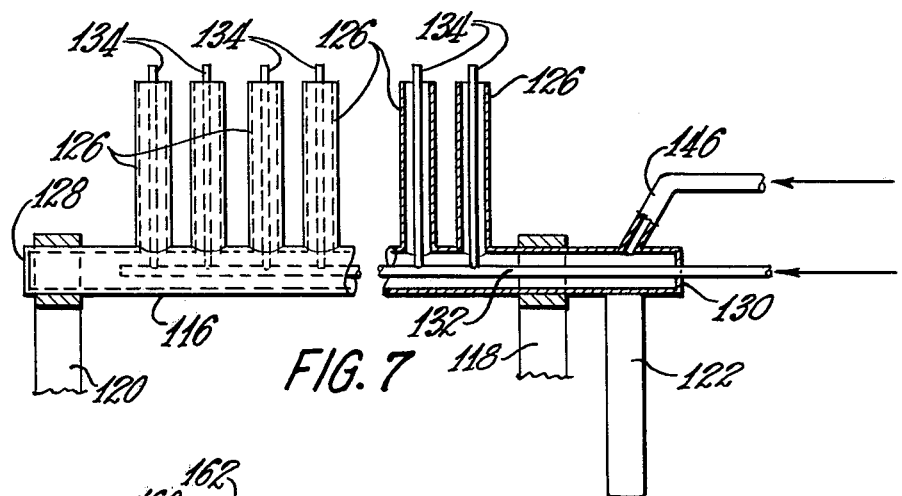
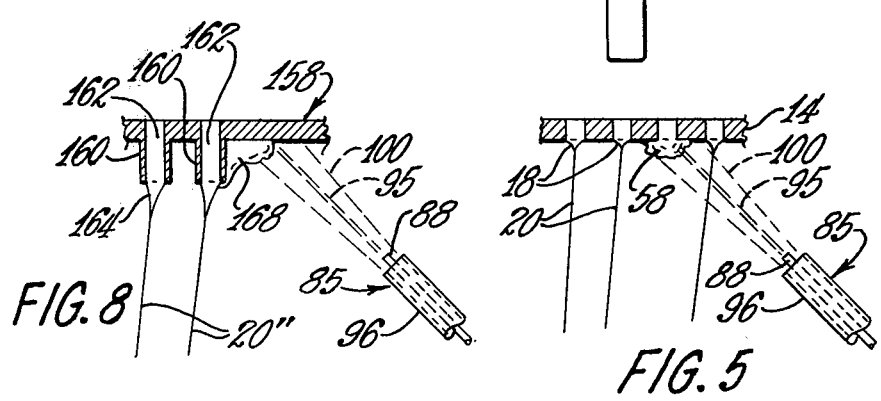

METHOD OF AND MEANS FOR REMOVAL OF GLASS FLOODS FROM A SURFACE OF A GLASS STREAM FEEDER

TECHNICAL FIELD

This invention relates to controlling or removing a flood of glass from a surface of a substrate, feeder or bushing from which flow streams of glass which are attenuated to continuous filaments or fibers by suitable method or means such as winding a strand or linear group of the filaments or fibers into a wound package.

BACKGROUND ART

It has been a conventional practice to flow streams of heat-softened glass from a stream feeder, bushing or substrate, and flooding of the glass on the surface of the stream feeder, bushing or substrate has presented difficulties. Glass flooding occurs occasionally on a stream feeder surface where the glass flow orifices are in depending projections or tips on the feeder surface. Flooding most always occurs when a filament breaks as it is being attenuated or pulled from a tipless bushing or orifice plate of a bushing wherein the stream flow orifices are merely openings in the orifice plate. Removing the "flood" can be a difficult and time-consuming effort.

In processes wherein glass streams are attenuated to fibers or continuous filaments the trend is toward the utilization of a stream feeder, bushing or substrate having a floor section or orifice plate provided with stream flow orifices without depending projections or tips. The use of an orifice plate without depending orificed projections enables the stream flow orifices to be more closely spaced which permits a substantial increase in the number of glass streams flowing from a feeder or bushing than is possible with a feeder or bushing having orificed projections.

Even when the glass constituting the flood is removed by conventional means such as a tool or bushing pick and fiber separation achieved, a residual thin layer of molten glass usually remains on the feeder floor tip section or orifice plate surface. Such thin layer of residual glass is undesirable because the emissivity of the molten glass layer introduces a radiation change relative to the radiated energy which would leave the surface if the thin glass layer were not on the surface. Furthermore, a residual film or layer of molten glass contributes to or fosters reflooding of the area because the surface is already "wetted" by the glass.

Carbon and/or graphite are known to be good nonwettable materials with respect to molten glass but they are fugitive and the carbon on the surface of a stream feeder or bushing is not permanent because of sublimation and/or oxidation to carbon dioxide at feeder or bushing temperatures. Up to the present time there has been no completely successful and economical means for removing a glass flood once formed on a stream feeder floor or orifice plate surface.

Methods have been devised for the purpose of preventing glass flooding of a stream flow section or orifice plate of a stream feeder or bushing but such methods are costly as they utilize an inert environment provided by a continuous flow of inert or nonoxidizing gas and a continuous flow of decomposable carbonaceous gas or other method employing continuous flow of a gas or gases.

For example, the United States patent to Russell No. 3,829,301 discloses a method wherein a hydrocarbon gas is decomposed to form hydrogen and carbon which prevent wetting of a stream feeder surface by molten glass.

Another method is disclosed in the U.S. Pat. to Veazie No. 3,989,494 for preventing flooding of glass which involves partial burning or combusting a combustible carbonaceous gas providing a reducing or luminous flame resulting from incomplete combustion of the gas whereby the flame yields particles of carbon effective at the surface of a stream feeder to prevent flooding.

A method has been proposed wherein glass streams flow from an orifice plate, the plate having porous regions supplied with gas delivered from the pores in the plate to prevent flooding of the glass on the surface. This method is disclosed in Russell U.S. Pat. No. 3,716,116.

In these above-described methods, the gases are supplied continuously and are for the purpose of preventing flooding of glass occurring on a surface of a stream feeder, bushing or substrate.

DISCLOSURE OF THE INVENTION

The present invention relates to a method of and apparatus for facilitating the removal of glass "floods" that may form on the tip section or orifice plate of a stream feeder or bushing from which normally flow streams of glass which are attenuated to filaments or fibers by winding a strand or group of the filaments or fibers into a package on a rotating collector or attenuated by other means.

More particularly, an object of the invention pertains to a method of and apparatus for providing a removable carbon deposit which is applied to the tip section or orifice plate of a bushing or stream feeder when needed, that is, during or after local flooding occurs at the area of a filament break-out.

The application of a carbon deposit may be achieved by applying a fine stream or streams of liquid carbonaceous or hydrocarbon material to the glass flood, the intensely hot surface of the tip section or orifice plate of the bushing and the heat of the glass decomposing the carbonaceous or hydrocarbon material momentarily releasing carbon particles at the flooded region of the surface of the tip section or orifice plate of the stream feeder or bushing.

It is found that carbon is released from decomposition of the liquid carbonaceous material in an atmospheric environment. It is also found that the decomposition effecting the release of carbon may be enhanced by providing a temporary nonoxidizing or inert atmosphere at the delivery region of the stream or streams of liquid carbonaceous material onto a glass flood on the hot surface of the tip section or orifice plate.

The carbon temporarily present effects a release of the flood and does not leave a residue of carbon on the hot surface of the feeder or bushing. The glass of the flood is removed or dissipated and falls by gravity from the tip section or orifice plate under the dewetting action of the carbon.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings.

BRIEF DESCRIPTION OF THE DRAWINGS

The details of the invention will be described in connection with the accompanying drawings in which:

FIG. 5 is a sectional view of a portion of an orifice plate or floor of the stream feeder or bushing having orifices accommodating the flow of glass streams without any tips or projections and illustrating the means shown in FIG. 4 for removing glass flood from the feeder floor or orifice plate;

FIG. 6 is an isometric schematic view of a stream flow region of a glass stream feeder in association with another form of means for establishing inert environments at regions of the stream flow surface of the feeder and for delivering streams of liquid carbonaceous or hydrocarbon material to regions of the feeder floor embraced in the inert environments for removing glass flood from the stream flow region of the stream feeder;

FIG. 7 is an enlarged fragmentary sectional view of a portion of the apparatus shown in FIG. 6, and FIG. 8 is a sectional view of a portion of a stream feeder floor having depending orificed projections accommodating flow of streams of glass, the view illustrating the arrangement shown in FIG. 4 for delivery of a gas providing an inert environment and the delivery of liquid carbonaceous or hydrocarbon material in the environment effective to remove a glass flood.

BEST MODE FOR CARRYING OUT THE INVENTION

The method of the invention and the apparatus for carrying out the method are adapted for use with a stream feeder, bushing or substrate. The floor of the feeder may be formed with depending orificed projections through which flow streams of heat-softened glass, or the floor may be a plate referred to herein as an orifice plate having openings or orifices without depending projections or tips for flowing streams of glass.

The method of the invention involves the delivery of a liquid carbonaceous material to a glass flooded area of a stream feeder, bushing or substrate for removing a glass flood that may occur on a feeder floor surface having depending orifice stream flow projections, or a glass flood resulting from breakouts of one or more filaments from a tipless orifice plate of a bushing, the method of the invention having particular utility in removing a glass flood at the time of its formation or after its formation.

Figure 1:
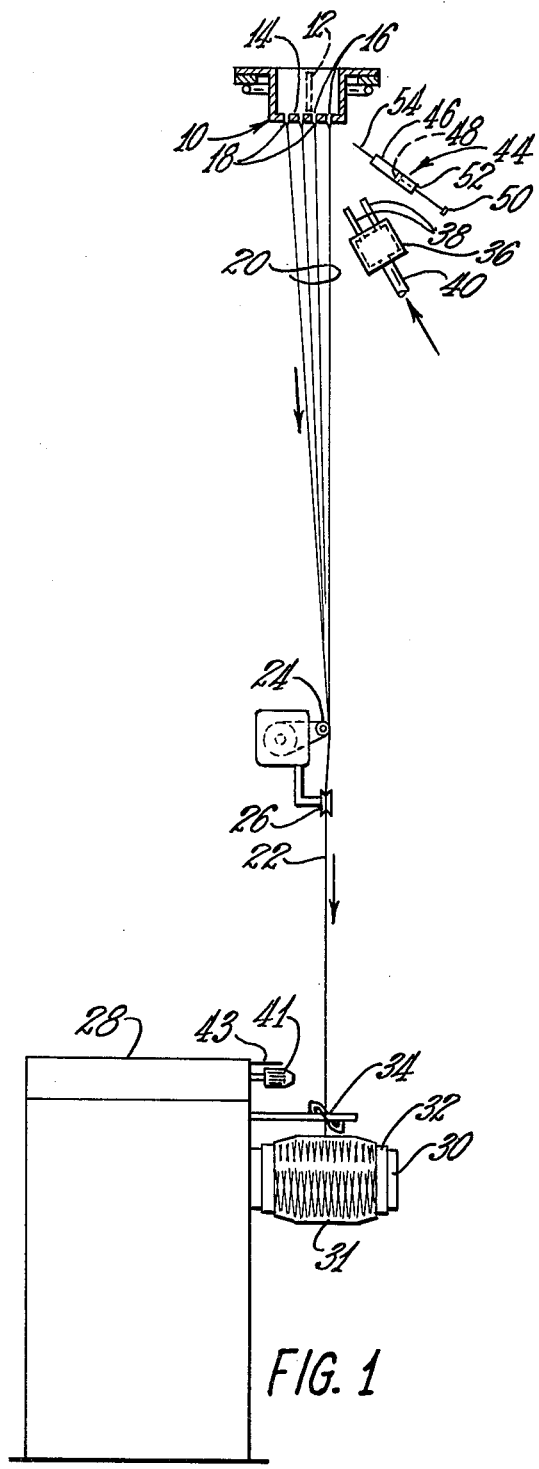
FIG. 1 is a schematic view of an arrangement for flowing streams of glass from a feeder, bushing or substrate, and attenuating the streams to filaments, the arrangement including means for delivering liquid carbonaceous or hydrocarbon material to the stream flow surface region of the bushing, feeder or substrate to remove a glass flood from the surface region.

Referring initially to FIG. 1, there is illustrated a stream feeder, bushing or substrate 10 adapted to contain heat-softened mineral material such as glass. The feeder 10 may be supplied with molten or heat-softened glass from a forehearth (not shown) which receives glass in a conventional manner from a melting furnace. The feeder 10 is fashioned of a metal or alloy capable of withstanding the high temperatures of molten glass, such as an alloy of platinum and rhodium or of other high temperature resistant material.

Figure 2:
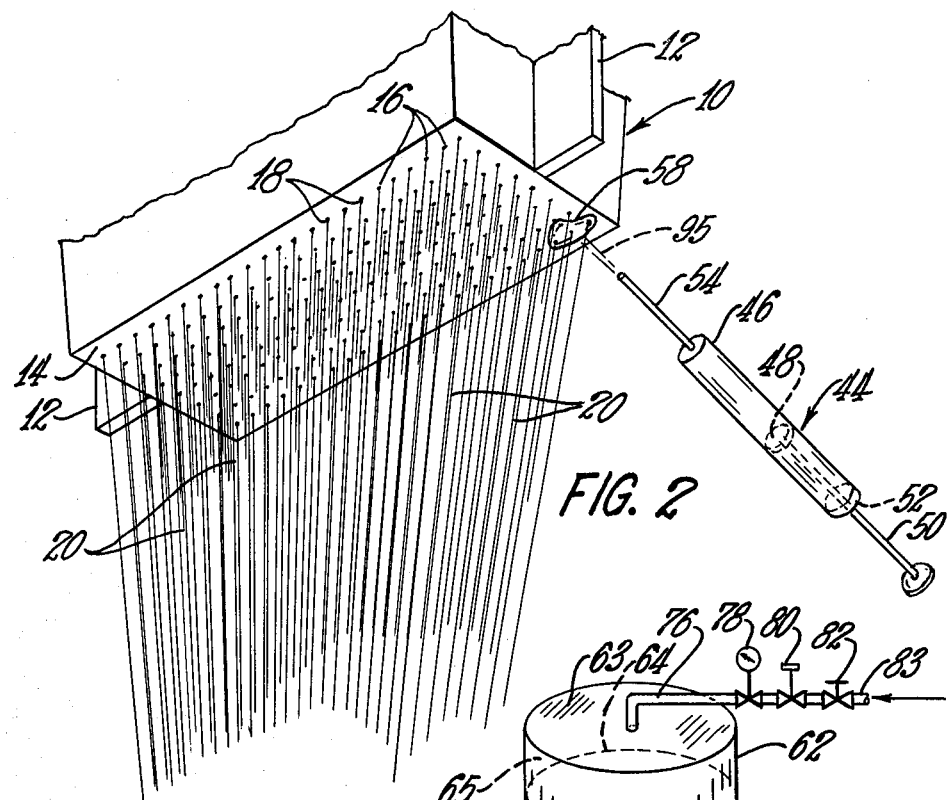
FIG. 2 is an enlarged isometric view of a portion of the stream feeder, bushing or substrate of FIG. 1 illustrating a means for delivering liquid carbonaceous or hydrocarbon material to a surface region of the feeder, bushing or substrate to remove a glass flood from the surface.

The stream feeder, bushing or substrate 10 is shown in more detail in FIG. 2. The stream feeder or bushing 10 is fashioned with terminal lugs 12 for connection with current supply conductors (not shown) for passing electric current through the feeder or bushing to maintain the glass in the feeder or bushing at the desired temperature and viscosity for flowing streams of glass from the feeder or bushing.

As illustrated in FIGS. 1 and 2 the feeder 10 is inclusive of a floor section 14 which is comparatively thin in the form of a planar plate herein referred to as an orifice plate having a plurality of openings or orifices 16 through which streams 18 of glass flow from the feeder. The streams of glass adjacent the openings are in the form of very short cones.

The glass streams 18 flowing from the orifices 16 are attenuated to filaments or fibers 20 by winding a strand 22 of the filaments into a package. The filaments 20 may engage an applicator 24 for applying sizing or other coating material onto the filaments, the filaments being converged below the applicator into the strand or linear group 22 by means of a gathering shoe or member 26.

A winding machine 28 is equipped with a rotatable collet 30 driven by a motor (not shown), the strand 22 being wound into a package 31 on a thin-walled tube 32 mounted on the collet 30. The speed of the winding collet 30 is programmed in a conventional manner whereby the glass streams are attenuated to filaments at a substantially constant rate so that the filaments throughout the package are of substantially the same diameters or sizes.

A rotatable and reciprocable traverse means 34 of conventional character engages the strand 22 and distributes the strand lengthwise of the collet, the traverse means oscillating the strand to effect a crossing of the individual wraps or convolutions of strand during the collection of the strand into a package.

In the use of a thin orifice plate or planar floor section 14 having stream flow orifices without any tips or projections depending from the floor or plate, it is desirable to direct jets or streams of air upwardly into contact with the orifice plate or floor section 14. As shown in FIG. 1 a manifold 36 containing air under pressure may be provided with several nozzles 38 which are directed upwardly toward the region of the orifice plate or floor section.

The manifold 36 may be connected by tubular means 40 with a blower or source of compressed air for delivery from the nozzles 38. The purpose of the air streams or gas streams from the nozzles 38 is to reduce the temperature of or cool the plate or floor section 14 as well as to cool the glass streams to raise the viscosity of the glass of the streams to an efficient attenuating temperature.

Means is provided for continuing standby attenuation of the glass streams to filaments during periods of start-up, filament break-outs, and during periods wherein a completed package of roving is being removed from the winding collet and an empty forming tube placed on the collet. There is provided a pair of journally supported pull rolls 41 of conventional character, one of which is shown in FIG. 1, the pull rolls 41 being rotated at a comparatively slow speed by a motor (not shown) contained within the housing of the winding machine 28.

Disposed adjacent the pull rolls is a wire loop or guide means 43 to maintain the strand in engagement with the pull rolls 41 during start-up or re-start following a filament break-out or during the removal of a completed package. The strand or bundle of filaments 22 during an operation of start-up or after a filament break-out is directed by the operator in engagement with the guide 43 and between the rotating pull rolls 41 which continue attenuation of the glass streams 18 but at a rate of speed much lower than the normal attenuating speed in winding a package of the strand. The pull roll arrangement is preferably of the character disclosed in the United States patent to Jackson U.S. Pat. No. 4,050,639.

Occasionally a filament break-out or break-outs occur and such broken filaments most always result in the glass flooding the lower surface area of the floor section or orifice plate 14 in the general region of the break-outs.

A principal object of the invention resides in the method of and apparatus for removing a glass flood from the feeder floor section or orifice plate 14 as the flood condition is forming or after the flood occurs.

When a break-out occurs and flooding ensues, the operator severs the strand 22 and entrains the bundle of unbroken remaining filaments in engagement with the loop or guide 43 and the pull rolls 41, the unbroken filaments causing a residual flood on the orifice plate or bushing floor.

The method and means of the invention includes the delivery of a liquid hydrocarbon or carbonaceous material which may be decomposed by heat to release carbon at the region of a flood of glass on the orifice plate or feeder floor to dissipate or remove the flood from the plate or feeder floor surface.

One form of apparatus for delivering a stream of heat-decomposable liquid hydrocarbon material onto a flood of glass is illustrated in FIGS. 1 and 2. The apparatus illustrated in FIGS. 1 and 2 includes a syringe or pressure gun 44. The syringe or pressure gun 44 includes a barrel or cylinder 46 within which is slidably contained a piston 48 connected with an operating rod or handle portion 50 which is slidable in an opening in an end cap 52 of the barrel or cylinder 46. The opposite end of the barrel or cylinder 46 is provided with a needle-like hypodermic-type nozzle 54.

In FIG. 2, a glass flood 58 is shown on a small surface region of the orifice plate or floor section 14. The operator previously fills the barrel or cylinder 46 with a liquid hydrocarbon or carbonaceous material which is decomposed in the high temperature environment at the surface of the orifice plate or floor section 14 and releases carbon particles which are immediately effective to remove or dissipate the flood 58.

When the operator becomes aware of the flood, he severs the strand 22 and engages the remaining filaments of the strand with the guide member 43 and the pull rolls 41 so that continued attenuation of the filaments occurs at a reduced attenuating speed. The operator then directs a fine stream of the liquid hydrocarbon material onto the flood from the syringe or hand pump 44 by depressing the piston 48.

The heat decomposes the hydrocarbon material and releases carbon particles which are immediately effective to remove or dissipate the flood 58 which falls with the glass streams flowing from the openings adjacent the flooded regions. The filaments trailing the flood are engaged with the pull rolls 41 by the operator so that all of the streams flowing from the stream feeder are attenuated to filaments. After all of the filaments are engaged with the pull rolls, the operator manually grasps the strand of filaments and transfers the strand onto a tube on the collet 30 which is rotated to form a new package.

Several hydrocarbon materials have been found useful in providing carbon particles to remove a glass flood from a stream feeder or bushing surface. It is found that vegetable oils such as peanut oil delivered into the heated environment of the bushing floor or orifice plate area by the instrument or pressure gun 44 are decomposed and release carbon which immediately removes or dissipates the flood.

One of the advantages of the invention is that the temporary release of carbon particles at the region of the flood effectively removes the flood condition. The peanut oil is only applied for a very short period of time so that there is no accumulation or build-up of carbon particles on the plate or floor surface. The carbon particles which effect a dewetting of the glass on the feeder or plate surface release the glass of the flood which falls with trailing filaments.

Upon removing of the flood condition, normal attenuation may be resumed and should continue uninterrupted unless and until a further filament break-out or break-outs occur in which event the operator severs the strand and transfers the strand to the pull rolls 41 and sprays liquid material from the syringe or pressure gun 44 onto the flooded area to relieve the flood.

Other heat-decomposable liquid hydrocarbon or carbonaceous materials may be used in the same manner as peanut oil. Safflower oil functions in the same manner as peanut oil and releases carbon particles under the high temperature conditions. Mineral oils that are sulphur free and which have a low vapor pressure and a high flash point may be decomposed by the high temperature to release carbon particles. A carbon fiber precursor such as phenol-formaldehyde resin, melamine-formaldehyde resin and urea-formaldehyde resin may also be decomposed under the high temperature conditions to release carbon particles for removing a glass flood.

The use of the method and apparatus enables the provision of a renewable carbon deposit when it is needed by reason of the forming of a flood or after a flood has formed on a surface. The release of carbon particles is effected only for the period that a liquid hydrocarbon material is delivered onto a flood on a bushing or feeder surface.

Figure 3:
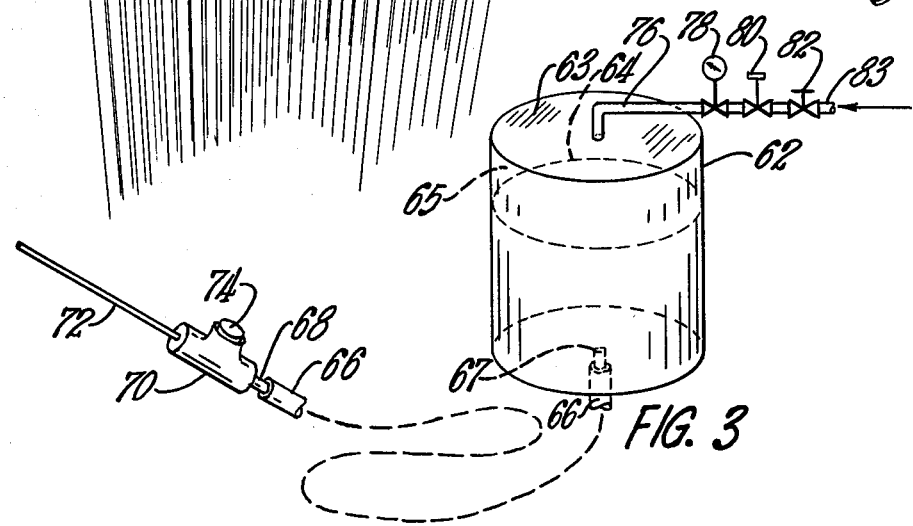
FIG. 3 illustrates a modified arrangement for carrying out the method of delivering liquid carbonaceous or hydrocarbon material to a bushing surface area.

FIG. 3 is illustrative of another form of apparatus for performing the method of removing a flood from a stream feeder, bushing or substrate. A receptacle, container or tank 62 is adapted to contain a liquid heat-decomposable hydrocarbon material 64. A flexible tubular member 66 has one end connected with the bottom of the tank 62 by a nipple or tubular member 67, the other end of the tubular member 66 being connected by a nipple or tubular member 68 with a hollow member or valve cage 70.

The member 70 is provided with a hypodermic-like nozzle or fine diameter tubular member 72. The member 70 contains a normally closed valve means or member 74 which may be manipulated by the operator to effect flow of hydrocarbon material from the tank 62 through the flexible member 66 through the valve cage 70 and hypodermic needle-like nozzle 72 onto a glass flood on an orifice plate or floor of a stream feeder or bushing.

Means is provided for pressurizing and controlling the pressure in the upper region 65 of the container above the level of the hydrocarbon material in the tank 62. A tubular member 76 is connected with the upper cover 63 of the tank 62. Connected in sequence with the tube 76 is a pressure gauge 78, a pressure regulating valve 80 of conventional character and a cutoff valve 82. The cutoff valve 82 is connected by a tube 83 with a blower or source of compressed air for pressurizing the hydrocarbon material in the tank 62.

Normally when there is no flood on a feeder floor or orifice plate, the valve 74 is closed, the valve 82 is open to admit air or other gas under pressure into the tank 62 and the pressure regulated in the tank 62 by the pressure regulating valve 80. In event of the formation of a flood, the operator grasps the valve cage or member 70, directs the hypodermic-like needle or nozzle 72 toward the flood of glass on the feeder or bushing and opens the valve 74 by depressing the same to effect pressure delivery of a fine stream of the liquid hydrocarbon or carbonaceous material 64 from the nozzle 72 onto the glass flood on the feeder or bushing surface.

The operator opens the valve 74 for only a short period of time. During this short period of time the carbonaceous or hydrocarbon material delivered from the nozzle 72 is decomposed by the heat from the bushing and glass thus releasing carbon particles which act to remove or dissipate the flood from the stream feeder or bushing. Normal attenuation may then be resumed as hereinbefore described.

The pyrolytic decomposition of the liquid carbonaceous or hydrocarbon material in releasing carbon particles may be enhanced by the momentary establishment of an isolating inert or nonoxidizing gaseous atmosphere or environment embracing the fine stream of liquid carbonaceous or hydrocarbon material directed toward a glass flood on the orifice plate or surface of the floor of the stream feeder or bushing. An operator-manipulated means or arrangement 85 of this character is illustrated in FIG. 4.

Figure 4:
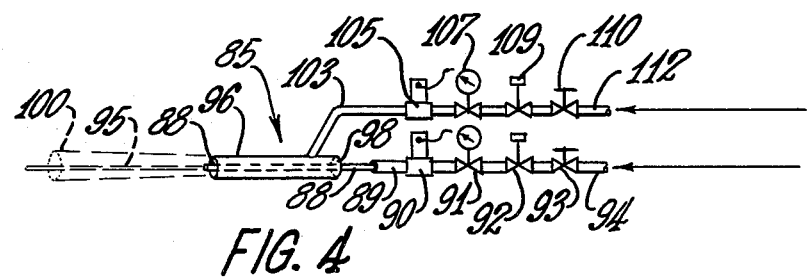
FIG. 4 is a semischematic elevational view of a means providing an inert environment at a bushing area and means for delivering liquid carbonaceous or hydrocarbon material onto a stream feeder area embraced in the inert environment.

The arrangement 85 shown in FIG. 4 includes a hypodermic needle-like nozzle or fine diameter nozzle 88 connected by a tubular means 89 with a solenoid-operated valve 90 of conventional construction, the latter being normally closed and which may be opened by an operator-controlled switch means (not shown). The valve 90, a pressure gauge 91, a pressure regulating valve 92 and a cutoff valve 93 are connected together in sequence, the cutoff valve 93 being connected by a flexible tube or tubular means 94 with a pressurized supply or source of heat-decomposable liquid carbonaceous or hydrocarbon material.

Surrounding the needle-like nozzle 88 is a second tubular nozzle or member 96 which opens adjacent the outer end of the nozzle 88, the opposite end being closed by a cover 98, the cover having an opening to admit the needle-like nozzle 88. The annular space between the body of the nozzle 96 and the nozzle 88 is adapted to receive inert gas for the temporary isolation or shrouding of the stream 95 of liquid carbonaceous or hydrocarbon material delivered from the needle-like nozzle 88.

The outer nozzle 96 is connected by tubular means 103 with a solenoid-operated valve 105 of conventional construction, the valve being normally closed but which may be opened by an operator-controlled switch means (not shown). A pressure gauge 107, a pressure regulating valve 109 and a cutoff valve 110 are connected together in sequence, the cutoff valve 110 being connected by a flexible tube or tubular means 112 with a pressurized supply of an inert or nonoxidizing gas such as nitrogen, carbon dioxide, helium, argon and the like which provides an inert or nonoxidizing gaseous shroud 100 embracing the stream of liquid hydrocarbon material.

When the apparatus illustrated in FIG. 4 is in readiness for use as shown in FIG. 5, the cutoff valves 93 and 110 are open and the solenoid-operated valves 90 and 105 are normally closed. Thus liquid hydrocarbon material under pressure exists at the entrance of the solenoid-operated valve 90 and an the inert or nonoxidizing gas exists under pressure up to the closed solenoid-operated valve 105.

In the event of a filament break-out or break-outs and a glass flood occurs on the orifice plate or bushing floor surface, the operator grasps the nozzle 96, manipulates the switch means (not shown) opening the solenoid valves 90 and 105 and directs the nozzles 88 and 96 toward the glass flood 58 on the orifice plate or bushing floor 14 shown in FIG. 5. The opening of the solenoid valves 90 and 105 effects the delivery of a fine stream 95 of liquid hydrocarbon material onto the glass flood, the stream of liquid being embraced or surrounded by the shroud of inert gas 100 delivered from the nozzle 96 and substantially isolating the liquid hydrocarbon material at the region of its delivery onto the glass flood.

Under the influence of the intense heat of the molten glass and the bushing floor or orifice plate, the liquid hydrocarbon material is decomposed to release carbon particles which are effective to remove the glass flood on the orifice plate or bushing floor. The carbon particles are effective to dewet the glass flood from the bushing, the glass flood falling and with it the trailing filaments from orifices or openings in the orifice plate or feeder floor at the area of the flooding.

Attenuation may be resumed as hereinbefore described in effecting a restart of normal attenuating operations. The glass "flood" is removed in a short period of time and the operator may then manipulate the switch means closing the solenoid-operated valves 90 and 105 to interrupt the flow of hydrocarbon material from the needle-like orifice 88 and interrupt the flow of inert gas from the exit of the nozzle 96.

It is to be understood that the operator has the option of utilizing the arrangement shown in FIG. 4 for delivering a stream 95 of liquid hydrocarbon material onto a glass flood on a stream feeder or bushing without utilizing the inert or nonoxidizing gas for shrouding the stream 95. Thus the operator may accomplish this method of use by simply leaving the solenoid-operated valve 105 in closed position or closing the cutoff valve 110. The stream 95 of hydrocarbon material would then be delivered onto the glass flooded area in a normal atmospheric environment.

FIGS. 6 and 7 illustrate a means or arrangement which may be movably mounted adjacent the stream flow region of the orifice plate or orifice floor section of a bushing or stream feeder so as to direct streams of liquid hydrocarbon material onto various areas of the orifice plate or feeder floor in event of a glass flood. The means or apparatus as illustrated in FIGS. 6 and 7 is equipped with a means or arrangement for delivering streams of inert or nonoxidizing gas embracing or encircling the streams of liquid hydrocarbon material for substantially isolating the streams of hydrocarbon material.

In FIG. 6 there is illustrated a stream feeder, bushing or substrate 10' having terminals 12' adapted to be connected with electric energy for heating and maintaining the heat-softened glass in the feeder or bushing at the proper temperature and viscosity. The planar orifice plate or floor section 14' is provided with a large number of closely spaced orifices 16' from which flow streams 18' of glass which are attenuated to filaments 20' by winding a strand of the filaments into a package on a winding machine as illustrated in FIG. 1.

The arrangement or apparatus is inclusive of a thin-walled tubular manifold 116 which is movably mounted or journaled for movement in support members 118 and 120. In the embodiment illustrated in FIGS. 6 and 7 the manifold 116 is journaled for rotative movement relative to the support means 118 and 120. Means is provided for effecting relative movement or rotation of the manifold 116.

In the embodiment shown in FIGS. 6 and 7 a handle member or means 122 is secured to the manifold 116 to enable the operator to adjust or rotate the manifold 116 to direct fine streams of liquid hydrocarbon material enshrouded in tubular streams of inert gas whereby the streams of liquid hydrocarbon material and streams of inert gas may be directed to a glass flooded area of the orifice plate or floor section 14' of the stream feeder, bushing or substrate 10'.

The manifold 116 is of a length substantially coextensive with the length of the stream feeder or bushing 10' and is provided with a substantial number of tubular nozzles 126 extending transversely from the manifold. The ends of the manifold 116 are closed by end caps or covers 128 and 130.

Extending lengthwise within the manifold 116 is a second manifold or tubular member 132 of lesser diameter than the diameter of the manifold 116. The tubular member 132 is provided with transversely extending hypodermic needle-like nozzles 134, the nozzles 134 being of much smaller diameter than the nozzles 126, each of the nozzles 134 being contained within a nozzle 126 as particularly shown in FIG. 7. The nozzles 134 preferably terminate a short distance beyond the ends of the nozzles 126.

The tubular means or manifold 132 extends through an opening in the cover 130 of the manifold 116 and is adapted to convey liquid hydrocarbon material to the nozzles 134. The nozzles 134 are adapted to deliver very fine streams of liquid hydrocarbon material toward the orifice plate or floor section 14' of the stream feeder or bushing.

As shown in FIG. 6 the tubular member or manifold 132 is connected with a solenoid-operated valve 136 of conventional construction, the latter being normally closed and which may be controlled by an operator-activated switch means (not shown). The valve 136, a pressure gauge 138, a pressure regulating valve 139 and a cutoff valve 140 are connected together in sequence, the cutoff valve 140 being connected by a flexible tube or tubular means 142 with a pressurized supply or source of liquid hydrocarbon material.

A tube or tubular member 146 is connected with the manifold 116 and is adapted to convey an inert or nonoxidizing gas into the manifold 116 for delivery through the nozzles 126 to provide a substantially nonoxidizing environment or atmosphere enshrouding or embracing the streams of liquid hydrocarbon material delivered from the fine diameter nozzles 134.

The tubular member 146 is connected with a solenoid-operated valve 148 of conventional construction. The valve 148, a pressure gauge 150, a pressure regulating valve 152 and a cutoff valve 153 are connected together in sequence, the cutoff valve 153 being connected by a flexible tube or tubular means 154 with a source or supply of inert or nonoxidizing gas such as nitrogen, carbon dioxide, helium, argon or the like.

When there is no glass flood on the floor section or orifice plate 14' of the stream feeder or bushing, the solenoid-operated valve 136 is normally closed and the liquid hydrocarbon material under pressure exists in tube 142 up to the solenoid-operated valve 136. The solenoid-operated valve 148 is closed and the pressurized inert or nonoxidizing gas is contained in the tube 154 up to the closed solenoid-controlled valve 148.

In event of a filament break-out or break-outs resulting in a glass flood, the operator severs the strand of filaments from the package and manipulates the manifold by the handle 122 to direct the nozzles 126 and 134 in the direction of the existing glass flood. The operator then actuates the solenoid-operated valves 136 and 148 by control switch means (not shown) to open these valves.

Upon opening of the valve 136 the liquid hydrocarbon material under pressure is delivered from the nozzles 134 toward the region of the glass flood and the opening of the solenoid-operated valve 148 effects flow of inert or nonoxidizing gas from the nozzles 126 whereby the gas from the nozzles 126 surrounds or enshrouds the streams of liquid hydrocarbon material providing a substantially inert region or nonoxidizing atmosphere about the streams of liquid hydrocarbon material. The pyrolytic decomposition of the liquid hydrocarbon material releases carbon particles which effectively remove the glass flood on the orifice plate or floor section of the stream feeder so that normal attenuation may be resumed.

The apparatus illustrated in FIGS. 6 and 7 may be utilized to direct liquid hydrocarbon material through the hypodermic-like nozzles 134 onto a glass flood on the orifice plate or floor section of the stream feeder in a normal atmospheric environment without enshrouding the streams of hydrocarbon material with an inert or nonoxidizing gas. Thus if the operator desires to effect the delivery only of hydrocarbon material onto the glass flooded region, the operator may accomplish this result by not opening the solenoid-operated valve 148 or manually closing the cutoff valve 153.

FIG. 8 illustrates the use of the apparatus 85 shown in FIGS. 4 and 5 in removing a glass flood from a floor section 158 of a bushing of the type having depending tubular projections 160 defining orifices or passages 162 through which streams 164 of glass flow from the stream feeder or bushing containing heat-softened or molten glass. The streams 164 are normally attenuated to filaments 20''. A portion of the apparatus 85 is illustrated in FIG. 8, the illustrated portion being the hypodermic needle-like nozzle 88 and the nozzle 96.

Assuming a glass flood 168 forms on the lower surface of the feeder floor section 158, the operator manually positions the apparatus 85 whereby the nozzles 88 and 96 are directed toward the flood 168 on the feeder floor section 158.

The operator then manipulates switch means (not shown) to open the solenoid-operated valves 90 and 105, shown in FIG. 4, whereby the hydrocarbon material is projected from the nozzle 88 onto the glass flood 168 and a tubular stream of inert or nonoxidizing gas is delivered from the nozzle 96 and enshrouds the stream of hydrocarbon material.

The heat of the glass in the stream feeder and the heat of the stream feeder decompose the hydrocarbon material releasing carbon particles which remove the glass flood 168 which falls from the feeder floor section 158. After removal of the glass flood 168, the operator closes the solenoid-operated valves 90 and 105 and effects restarting of attenuating operations as hereinbefore described.

It is to be understood that the operator may utilize the apparatus 85 to direct the stream of hydrocarbon material delivered from the nozzle 88 onto the glass flood without delivering inert or nonoxidizing gas from the nozzle 96 in effecting removal of a glass flood.

The needle-like hypodermic type nozzles or tubular members for delivering liquid hydrocarbon or carbonaceous material onto a glass flood are preferably of fine interior diameters of about ten thousandths of an inch or more. The interior diameters of the needle-like hypodermic type nozzles may be varied depending upon the size of streams of liquid carbonaceous or hydrocarbon material desired to effectively remove a glass flood on a stream feeder, bushing or substrate.

It is apparent that, within the scope of the invention, modifications and different arrangements may be made other than as herein disclosed, and the present disclosure is illustrative merely, the invention comprehending all variations thereof.

We claim:

1. The method of controlling molten glass at a surface of a substrate having orifices from which flow streams of molten glass including supplying a heat-decomposable liquid carbonaceous material to a glass flood on a surface area of the substrate, decomposing the liquid carbonaceous material at the region of the glass flood on the substrate under the influence of the high temperature environment of the substrate and molten glass to release carbon particles from the carbonaceous material, and removing the glass flood from the substrate surface by the carbon particles.

2. The method according to claim 1 wherein the liquid carbonaceous material is selected from the group comprising phenol-formaldehyde resin, melamine-formaldehyde resin and urea-formaldehyde resin.

3. The method of removing a glass flood from a surface of a substrate having orifices from which normally flow streams of molten glass including delivering a heat-decomposable carbonaceous oil to a glass flood on a surface area of the substrate, decomposing the oil at the region of the glass flood on the substrate under the influence of the high temperature environment of the substrate and molten glass to release carbon particles at the glass flooded area of the substrate, and removing the glass flood on the area by the released carbon particles.

4. The method according to claim 3 wherein the oil is a substantially sulphur-free mineral oil.

5. The method according to claim 3 wherein the oil is a vegetable oil.

6. The method according to claim 5 wherein the vegetable oil is peanut oil.

7. The method according to claim 5 wherein the vegetable oil is saffrin oil.

8. The method of controlling molten glass at a surface of a substrate having orifices from which flow streams of molten glass including projecting a stream of decomposable liquid carbonaceous material to a glass flood on a surface area of the substrate, decomposing the carbonaceous material of the stream at the region of the flooding on the substrate under the influence of the high temperature environment of the substrate and molten glass to release carbon particles from the carbonaceous material, and removing the glass flood from the substrate surface by the carbon particles.

9. The method of controlling molten glass at a surface of a substrate having orifices from which flow streams of molten glass including supplying a heat-decomposable liquid hydrocarbon material to a glass flood on a surface area of the substrate, decomposing the hydrocarbon material at the region of the glass flood on the substrate under the influence of the high temperature environment of the substrate and molten glass to release carbon particles from the hydrocarbon material, and removing the glass flood from the substrate surface by the carbon particles.

10. The method of removing a glass flood from a surface of a substrate having orifices from which normally flow streams of molten glass including delivering a heat-decomposable liquid carbonaceous material to a glass flood on a surface area of the substrate, decomposing the liquid carbonaceous material at the region of the glass flood under the influence of the high temperature environment of the substrate and molten glass to release carbon particles from the carbonaceous material at the glass flooded area of the substrate, and removing the glass flood on the area by the released carbon particles.

11. The method of controlling molten glass at a surface of a substrate having orifices from which flow streams of molten glass including delivering a decomposable liquid carbonaceous material onto a glass flood on a surface area of the substrate, enshrouding the carbonaceous material in a nonoxidizing environment, decomposing the carbonaceous material under the influence of the high temperature environment of the substrate and molten glass to release carbon particles at the glass flooded area of the substrate, and removing the glass flood on the area by the released carbon particles.

12. The method of removing a glass flood from a surface of a substrate having orifices from which normally flow streams of molten glass including delivering a heat-decomposable liquid carbonaceous material onto a glass flood on a surface of the substrate, enshrouding the liquid carbonaceous material at the region of the glass flood by a nonoxidizing gas, decomposing the carbonaceous material at the region of the glass flood on the substrate under the influence of the high temperature of the substrate and molten glass to release carbon particles from the carbonaceous material, and removing the glass flood from the substrate surface by the carbon particles.

13. The method of removing a glass flood from a surface of a substrate having orifices from which normally flow streams of molten glass including projecting a stream of heat-decomposable liquid carbonaceous material onto a glass flood on the surface of the substrate, enshrouding the stream of liquid carbonaceous material by a nonoxidizing gas, decomposing the carbonaceous material at the region of the glass flood on the substrate under the influence of the high temperature of the substrate and molten glass to release carbon particles from the carbonaceous material, and removing the glass flood from the substrate by the carbon particles.

14. The method of removing a glass flood from a surface of a substrate having orifices from which normally flow streams of molten glass including projecting streams of heat-decomposable liquid carbonaceous material onto a glass flood on the surface of the substrate, enshrouding the streams of liquid carbonaceous material in a nonoxidizing environment, decomposing the carbonaceous material at the region of the substrate under the influence of the high temperature of the substrate and molten glass to release carbon particles from the carbonaceous material, and removing the glass flood from the substrate by the carbon particles.

15. The method of removing a glass flood from a surface of a substrate having orifices from which normally flow streams of molten glass including projecting streams of heat-decomposable liquid carbonaceous material onto a glass flood on the surface of the substrate, enshrouding each stream of liquid carbonaceous material by a stream of nonoxidizing gas, decomposing the carbonaceous material at the region of the substrate under the influence of the high temperature of the substrate and molten glass to release carbon particles from the carbonaceous material, and removing the glass flood from the substrate by the carbon particles.

16. Apparatus for effecting removal of a glass flood on a surface of a substrate having orifices from which normally flow streams of glass, a manifold disposed adjacent the substrate, a plurality of nozzle means connected with the manifold, means for supplying a liquid carbonaceous material under pressure to the manifold for delivery of streams of liquid material from the nozzle means, said manifold being movable to positions for directing streams of liquid carbonaceous material from the nozzles onto various areas of the substrate surface, the liquid carbonaceous material being decomposed by the heat of the molten glass and heat of the substrate to release carbon particles at the region of the glass flood, the carbon particles being effective to remove the glass flood from the substrate.

17. Apparatus according to claim 16 including valve means for controlling delivery of carbonaceous material from the nozzle means.

18. Apparatus for effecting removal of a glass flood on a surface of a substrate having orifices from which normally flow streams of glass, a first manifold disposed adjacent the substrate, first nozzle means connected with the first manifold, means for supplying a liquid carbonaceous material under pressure to the first manifold for delivery of liquid material from the first nozzle means, a second manifold, second nozzle means connected with said second manifold, means for supplying a nonoxidizing gas under pressure to said second manifold for delivery of the nonoxidizing gas from the second nozzle means to establish a nonoxidizing environment, said manifolds being movable to positions for directing the liquid carbonaceous material from the first nozzle means and the nonoxidizing gas from the second nozzle means onto various areas of the substrate surface, the liquid carbonaceous material being decomposed by the heat of the molten glass and heat of the substrate to release carbon particles at the region of the glass flood, the carbon particles being effective to remove the glass flood from the substrate.

19. Apparatus according to claim 18 including means for controlling flow of liquid carbonaceous material to the first manifold, and means for controlling flow of nonoxidizing gas to the second manifold.

20. Apparatus for effecting removal of a glass flood on the surface of a substrate having orifices from which normally flow streams of glass, a first manifold disposed adjacent the substrate, a first group of nozzles connected with the first manifold, means for supplying a liquid carbonaceous material under pressure to the first manifold for delivery of streams of liquid material from the first group of nozzles, second manifold means surrounding the first manifold means, a second group of nozzles connected with the second manifold, means for supplying a nonoxidizing gas under pressure to said second manifold for delivery of the nonoxidizing gas from the nozzles of the second group, said manifolds being movable to positions for directing the streams of liquid carbonaceous material from the first group of nozzles and directing streams of the nonoxidizing gas from the second group of nozzles onto various areas of the substrate surface, the liquid carbonaceous material being decomposed by the heat of the molten glass and the heat of the substrate in the nonoxidizing atmosphere to release carbon particles at the region of the glass flood, the carbon particles being effective to remove the glass flood from the substrate.

21. Apparatus according to claim 20 wherein each individual nozzle of the first group is surrounded by an individual nozzle of the second group.

22. Apparatus according to claim 20 including control means for regulating the flow of liquid carbonaceous material and nonoxidizing gas to the first and second manifolds.

23. The method of removing a glass flood from a surface of a substrate having orifices from which normally flow streams of molten glass including delivering a heat-decomposable liquid carbonaceous material onto a glass flood on a surface area of the substrate, decomposing the liquid carbonaceous material in an atmospheric environment at the region of the glass flood under the influence of the high temperature environment of the substrate and molten glass to release carbon particles from the carbonaceous material at the glass flooded area of the substrate, and removing the glass flood on the area by the released carbon particles.

24. The method of removing a glass flood from a surface of a substrate having orifices from which normally flow streams of molten glass including projecting streams of heat-decomposable liquid carbonaceous material onto a glass flood on the surface of the substrate, decomposing the carbonaceous material of the streams in an atmospheric environment at the region of the substrate under the influence of the high temperature of the substrate and molten glass to release carbon particles from the carbonaceous material, and removing the glass flood from the substrate by the carbon particles.

* * * * *